Sept. 9, 1958 T. J. KOLESA 2,850,989
LOCKING CENTER PIN FOR RAILWAY CARS
Filed Aug. 10, 1955 2 Sheets-Sheet 1

Inventor:
Thomas J. Kolesa.
By George H. Simmons
Atty

Sept. 9, 1958     T. J. KOLESA     2,850,989
LOCKING CENTER PIN FOR RAILWAY CARS
Filed Aug. 10, 1955     2 Sheets-Sheet 2
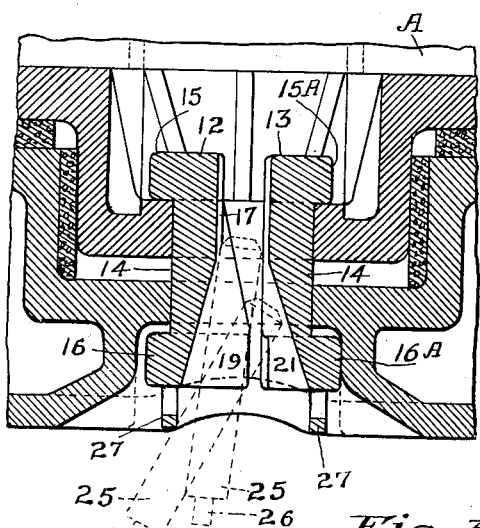
Fig. 3
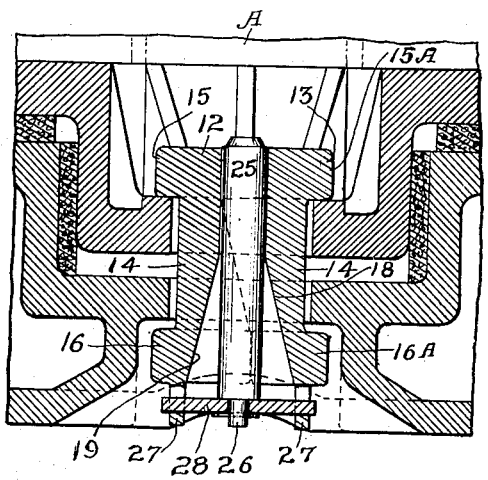
Fig. 4
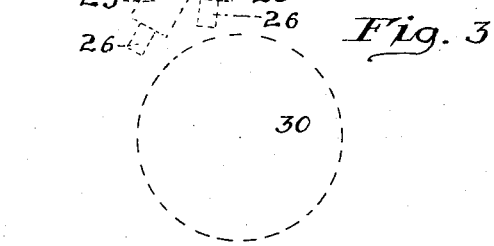
Fig. 5
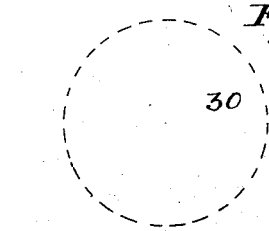
Fig. 6
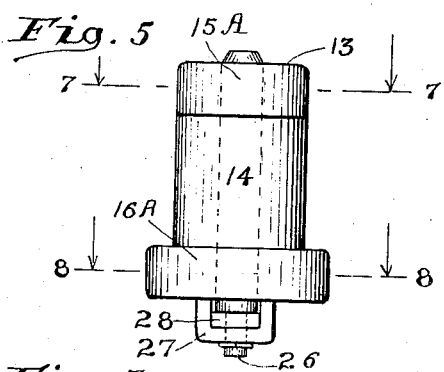
Fig. 7     Fig. 8
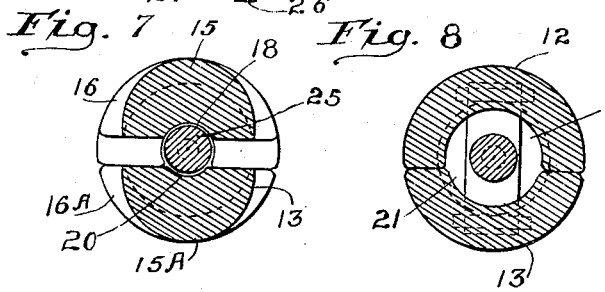
Inventor:
Thomas J. Kolesa.
By
George H. Simmons
Atty.

United States Patent Office 2,850,989
Patented Sept. 9, 1958

2,850,989

LOCKING CENTER PIN FOR RAILWAY CARS

Thomas J. Kolesa, Edwardsville, Ill., assignor to W. H. Miner, Inc., Chicago, Ill., a corporation of Delaware Application August 10, 1955, Serial No. 527,480

4 Claims. (Cl. 105—200)

This invention relates to improvements in locking center pin for railway cars.

It is a main object of the invention to provide an improved center pin for securing the body bolster of a car to the truck bolster, which pin can be inserted in the pin receiving openings in the center plates of the bolsters from beneath the truck bolster, notwithstanding that the middle axle of a six-wheel truck is centered on the axis of said openings and disposed but a short distance below the truck bolster.

Another object of the invention is to provide a center pin as described in the preceding object, which, when installed in the bolsters, is securely locked therein to prevent it from being worked loose by vibrations of the truck during operation of the car.

Further objects of the invention not specifically mentioned here will be apparent from the detailed description and claims which follow, reference being had to the accompanying drawings in which a preferred embodiment of the invention is shown by way of example and in which:

Figure 3 is a fragmentary cross sectional view similar to Figure 1, illustrating the assembly of the center pin;

Figure 4 is a fragmentary cross sectional view through the bolsters and center pin;

Figure 5 is an elevational view of the center pin;

Figure 6 is a bottom side plan view of the center pin;

Figure 1:
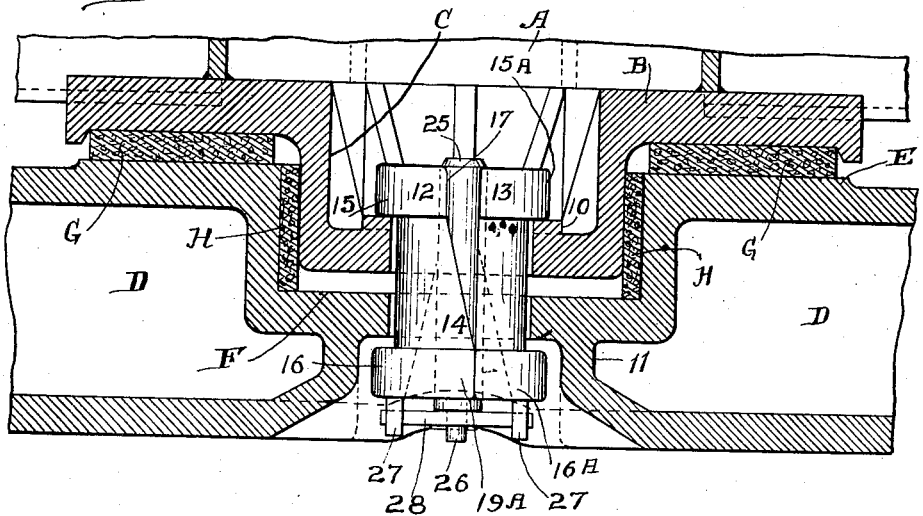
Figure 1 is a fragmentary cross sectional view through the truck and body bolsters, taken along the longitudinal median plane therethrough and with the center pin shown in elevation.
Figure 2:
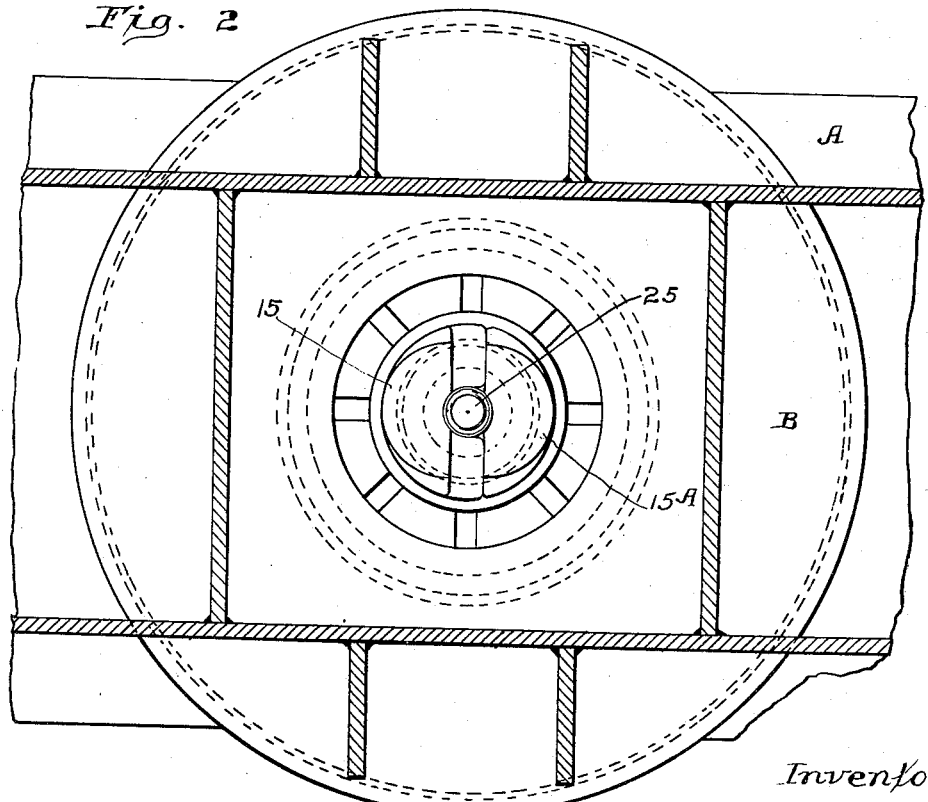
Figure 2 is a plan view of the bolsters, partly in section.

Figure 7 is a cross sectional view, taken along the line 7 and 7 of Figure 5, looking in the direction of the arrows; and Figure 8 is a cross sectional view through the center pin, taken along the line 8—8 of Figure 5, looking in the direction of the arrows.

Center pins are commonly employed to lock the truck bolster to the body bolster of a car, thereby to prevent separation of the trucks from the car in cases of derailment and other contingencies. In passenger cars, particularly diners, buffet cars and the like, equipment fixed within the car is disposed directly above the bolsters, making necessary the insertion of the center pins from beneath the truck bolster. In cars employing six-wheel trucks, the middle axle of the truck is aligned with the axes of the bolster center plates and located but a short distance beneath the truck bolster, thereby making the insertion of the center pin more difficult. The center pin of the present invention is specifically designed to permit it to be inserted from the underside of the truck bolster, notwithstanding that the truck is a six-wheel truck.

The invention will be best understood by reference to the accompanying drawings.

In the drawings, the body bolster A, shown by way of example, includes a center plate B, which is in the form of a casting, from the center of which a male center portion C projects. The truck bolster D includes an integral center plate E, into which a female socket F is depressed. As shown, the truck bolster is cast and contains the members usually found in such construction. Interposed between the body center plate B and the truck center plate E is an insulating disk G which serves to dampen out vibrations of the truck to prevent their transmittal to the body of the car. A similar insulating sleeve H is interposed between the male and female portions of the center plates in the usual manner.

The particular details of construction of the body and truck bolster are not of the essence of the present invention. So long as these bolsters contain aligned openings 10 and 11, respectively, into which the center pin is adapted to fit, the conditions of the invention are met.

The center pin consists of two outer members 12 and 13, which when placed in operative position have a generally cylindrical center portion 14 adapted to fit in the aligned openings 10 and 11. Projecting outwardly from the upper end of the member 12 is a cylindrical flange 15 that is positioned eccentrically with respect to the cylindrical portion 14 of the member. At the bottom end of the member 13 is a cylindrical flange 16 that is located concentrically with respect to the cylindrical portion 14 of the member. The inner surface of the member 12 is planar, and at the upper portion thereof is spaced outwardly from and parallel to the axis of the aligned openings 10 and 11, as indicated at 17 in Figure 3. This upper portion of the inner surface of the member 12 contains a generally semi-cylindrical groove 18 which flares outwardly to form a frusto semi-conical portion 19 opening into the lower end of the member. It will be noted that at the bottom portion of the member 12, the walls thereof extend outwardly past the axis of the openings into which the pin is fitted, as indicated at 19-A in Figure 1.

The exterior portion of the outer member 13 is the same as that of the member 12, and has an eccentrically placed upper flange 15A, and a concentrically placed lower flange 16A. The inner surface of the member 13 is planar throughout its entire length and lies outwardly of and parallel to the axis of the openings through which the pin projects. The inner surface of the member 13 contains a generally cylindrical groove 20 at its uppermost portion, which groove flares outwardly to form a section of a frusto-conical grove 21 at the bottom of the member.

A spreader rod 25 is of such dimension as to engage the walls of the cylindrical groove portions 18 and 20, and extends therefrom downwardly co-axially of the frusto-conical portions 19 and 21 of the groove. Depending from the lower end of the rod 25 is a reduced diameter portion 26 which is perforated.

Depending from the bottom edges of the members 12 and 13 are stirrups 27 through which is extended a locking bar 28, which bar contains a perforation through which the reduced diameter portion 26 of the spreader rod 25 projects. A cotter pin 29 is extended through the perforation in the reduced diameter portion 26 and abuts against the under surface of the locking bar 28 to hold the assembly together.

In assembling the center pin in the bolsters, outer portion 13 is inserted through the aligned openings and moved outwardly into the position shown in Figure 3, after which member 12 is inserted. The spreader rod 25 is then inserted, and because of the frusto-conical portions 19 and 21 of the groove, the rod 25 can be manipulated in the manner illustrated in dotted lines in Figure 3, notwithstanding the fact that the axle 30 of the truck is positioned close to the under surface of the bolster. With the rod 25 completely inserted, the locking bar 28 is then put into place, the rod allowed to slide downwardly until the reduced diameter portion 26 thereof projects through the locking bar, after which the cotter pin 29 is inserted.

With the spreader rod 25 thus positioned, the members 12 and 13 are held in operative position at their upper ends by engagement of the spreader rod 25 with the walls of the grooves in the member. At the lower end, members 12 and 13 are held together by abutment of the portion 19 of the member 12 with the inner planar face of the member 13. Displacement of the spreader rod 25 is prevented by the lock 28, which lock in turn is prevented from moving longitudinally of itself through the stirrups by the reduced diameter portion 26 projecting therethrough.

Flanges 15 and 15A project outwardly over the edges of the perforation 10 in the body center plate, thereby to support the center pin in the body bolster A. Should the body bolster tend to move upwardly with respect to the truck bolster, flanges 16 and 16A on the center pin will move into engagement with the truck bolster center plate E and separation of the bolsters will be prevented thereby.

While I have chosen to illustrate my invention by showing and describing a preferred embodiment of it, I have done so by way of example only, as there are many modifications and adaptations that can be made within the teachings of the invention.

Having thus complied with the statutes and shown and described a preferred embodiment of the invention, what I consider new and desire to have protected by Letters Patent is pointed out in the appended claims.

What I claim is:

1. A center pin for locking together the body and truck bolsters of a railway car, which pin is insertable from beneath the truck bolster of a six wheel truck and comprises: a pair of outer members having generally semi-cylindrical outer surfaces; flanges projecting outwardly from the ends of said surfaces, the adjacent inner surfaces of said members containing grooves which together form a generally cylindrical section opening into the upper ends of the members, and a generally frusto-conical section opening into the bottom ends of the members; a spreader rod disposed in said groove in engagement with the generally cylindrical section thereof and extending coaxially through the generally frusto-conical section thereof, said rod having an extension at its lower end which contains an opening; a stirrup depending from the bottom edge of each of said members; a lock bar extending between said stirrups and containing an opening through which said extension projects; and a cotter pin projecting through the opening in said extension and disposed against the under side of said lock bar for holding the center pin together as a unit.

2. A center pin as specified in claim 1, in which the inner surface of one of the generally semi-cylindrical members is planar and is spaced outwardly of and parallel to the axis of the pin receiving openings in the bolsters and in which the inner surface of the other member is planar and similarly spaced at the upper portion of the member and angles therefrom into engagement with the inner surface of the first named member at the bottom of the members.

3. A center pin as specified in claim 1, in which flanges at the upper ends of the members are of semi-cylindrical shape and eccentrically positioned with respect to the members, and the flanges at the lower ends of the members are of semi-cylindrical shape and concentrically positioned with respect to the members.

4. A center pin as specified in claim 1, in which the flanges at the upper ends of the members engage the upper surface of the center plate of the body bolster to support the pin in the bolsters and in which the flanges at the lower end of the members are disposed beneath the center plate of the truck bolster to prevent separation of the bolsters.

References Cited in the file of this patent

UNITED STATES PATENTS

| | | |
|---|---|---|
| 1,224,573 | Schulz | May 1, 1917 |
| 2,475,660 | Dath | July 12, 1949 |
| 2,475,661 | Dath | July 12, 1949 |
| 2,519,504 | Robertson | Aug. 22, 1950 |